United States Patent
Miller et al.

(10) Patent No.: US 11,295,221 B2
(45) Date of Patent: *Apr. 5, 2022

(54) LEARNING USER PREFERENCES IN A CONVERSATIONAL SYSTEM

(71) Applicant: Verint Americas Inc., Alpharetta, GA (US)

(72) Inventors: Tanya M. Miller, Colbert, WA (US); Ian Beaver, Spokane Valley, WA (US)

(73) Assignee: VERINT AMERICAS INC., Alpharetta, GA (US)

( * ) Notice: Subject to any disclaimer, the term of this patent is extended or adjusted under 35 U.S.C. 154(b) by 290 days.

This patent is subject to a terminal disclaimer.

(21) Appl. No.: 16/539,345

(22) Filed: Aug. 13, 2019

(65) Prior Publication Data

US 2019/0362252 A1  Nov. 28, 2019

Related U.S. Application Data

(63) Continuation of application No. 14/181,608, filed on Feb. 14, 2014, now Pat. No. 10,417,567.

(60) Provisional application No. 61/764,985, filed on Feb. 14, 2013.

(51) Int. Cl.
    *G06N 5/04*      (2006.01)
    *G06N 20/00*     (2019.01)
(52) U.S. Cl.
    CPC ............... *G06N 5/04* (2013.01); *G06N 20/00* (2019.01)
(58) Field of Classification Search
    None
    See application file for complete search history.

(56) References Cited

U.S. PATENT DOCUMENTS

| 8,677,377 B2 | 3/2014 | Cheyer et al. |
| 2007/0288404 A1 | 12/2007 | Kacmarcik |
| 2016/0099892 A1 | 4/2016 | Palakovich et al. |

OTHER PUBLICATIONS

Aha, D., et al., "Advances in conversational case-based reasoning," The Knowledge Engineering Review, vol. 20, No. 3, 2005, pp. 247-254.
Aha, D., et al., "Conversational Case-Based Reasoning," Applied Intelligence, vol. 14, No. 14, 2001, pp. 9-32.
Aha, D., et al., "Supporting Dialogue Inferencing in Conversational Case-Based Reasoning," European Workshop on Advances in Case-Based Reasoning, 1998, 12 pages.
Berube, D., "Encode video with MongoDB work queues: Techniques to easily store and process complex jobs," retrieved Feb. 11, 2014 from http://www.ibm.com/developerworks/library/os-mongodb-work-queues, IBM, 2012, 9 pages.

(Continued)

*Primary Examiner* — Daniel T Pellett
(74) *Attorney, Agent, or Firm* — Meunier Carlin & Curfman LLC

(57) ABSTRACT

Conversation user interfaces that are configured for virtual assistant interaction may include tasks to be completed that may have repetitious entry of the same or similar information. User preferences may be learned by the system and may be confirmed by the user prior to the learned preference being implemented. Learned preferences may be identified in near real-time on large collections of data for a large population of users. Further, the learned preferences may be based at least in part on previous conversations and actions between the system and the user as well as user-defined occurrence thresholds.

19 Claims, 11 Drawing Sheets

(56) References Cited

OTHER PUBLICATIONS

Bobrow, D., et al., "Gus, A Frame Driven Dialog System," Artificial Intelligence, vol. 8, No. 2, 1977, pp. 155-173.
Bohus, D., et al., "The RavenClaw dialog management framework: Architecture and systems," Computer Speech & Language, vol. 23, 2009, pp. 332-361.
Bonnet, L., et al., "Reduce You Say: What NoSQL Can do for Data Aggregation and BI in Large Repositories," $22^{nd}$ International Workshop on Database and Expert Systems and Applications (DEXA), 2011, pp. 483-488.
Bridge, D., et al. "Case-based recommender systems," The Knowledge Engineering Review, vol. 20, No. 3, 2006, pp. 315-320.
Dean, J., et al., "MapReduce: Simplified Data Processing on Large Clusters," Communications of the ACM, Vo. 51, No. 1, 2008, pp. 107-113.
De Mantaras, R., et al., "Retrieval, reuse, revision and retention in case-based reasoning," The Knowledge Engineering Review, vol. 20, No. 3, 2005, pp. 215-240.
Göker, M., et al., "Personalized Conversational Case-Based Recommendation," European Workshop on Advances in Case-Based Reasoning, 2000, 12 pages.
Gotszling, L., "MongoDB as a Message Queue," retrieved on Feb. 11, 2014, from http://www.mongodb.com/presentations/mongodb-message-queue, 2011, 2 pgs.
Gu, M., et al., "A Knowledge-Intensive Method for Conversational CBR," International Conference on Case-based Reasoning, 2005, 15 pages.
Hayes, C., "A Case-Based Reasoning View of Automated Collaborative Filtering," International Conference on Case-Based Reasoning, 2001, 15 pages.
Horowitz, E., "Schema Design at Scale," retrieved on Feb. 11, 2014 from http://www.mongodb.com/presentations/schema-design-scale-1, Presentation, Dec. 2011, 1 page.
Levin, E., et al., "The AT&T-DARPA Communicator Mixed-Initiative Spoken Dialog System," Interspeech, 2000, 4 pages.
Linden, G., et al., "Interactive Assessment of User Preference Models: The Automated Travel Assistant," User Modeling: Proceedings of the Sixth International Conference, UM, 1997, 12 pp. 67-78.
McCarthy, K., et al., "On the Dynamic Generation of Compound Critiques in Conversational Recommender Systems," International Conference on Adaptive Hypermedia and Adaptive Web-Based Systems, 2004, 9 pages.
MongoDB 2.4 Release Notes, retrieved on Feb. 11, 2014 from http://docs.mongodb.org/manual/release-notes/2.4, 2013, 8 pages.
Schafer, J., et al., "Meta-recommendation Systems: User-controlled Integration of Diverse Recommendations," Proceedings of the eleventh International Conference on Information and Knowledge Management, ACM, 2002, pp. 43-51.
Schiaffino, S., et al., "User profiling with Case-Based Reasoning and Bayesian Networks," IBERAMIA-SBIA, 2000, 11 pages.
Sugiyama, K., et al., "Adaptive Web Search Based on User Profile Constructed without Any Effort from Users," Proceedings of the 13th International Conference on World Wide Web, ACM, 2004, 10 pages.

LEARNING USER PREFERENCES IN A CONVERSATIONAL SYSTEM

CROSS REFERENCE TO RELATED APPLICATIONS

This application claims priority to, and is a continuation of U.S. Ser. No. 14/181,608, which is a Non-Provisional of and claims priority to U.S. provisional patent application, Ser. No. 61/764,985, filed Feb. 14, 2013, entitled "Learning User Preferences in a Conversational System" the benefit of the filing dates of which are hereby claimed under 35 U.S.C. § 119(e) and are hereby incorporated by reference in their entireties.

BACKGROUND

A growing number of people are using smart devices, such as smart phones, tablet computers, laptop computers, and so on, to perform a variety of functionality. In many instances, the users interact with their devices through a virtual assistant. The virtual assistant may communicate with a user to perform a desired task, such as searching for content, checking into a flight, setting a calendar appointment, and so on. As the user interacts with the virtual assistant, the user may be required to repeatedly input the same information to complete a task. Accordingly, there is an increasing need to interface with a virtual assistant in an efficient manner, particularly when a task is repeated where a user inputs the same information each time.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
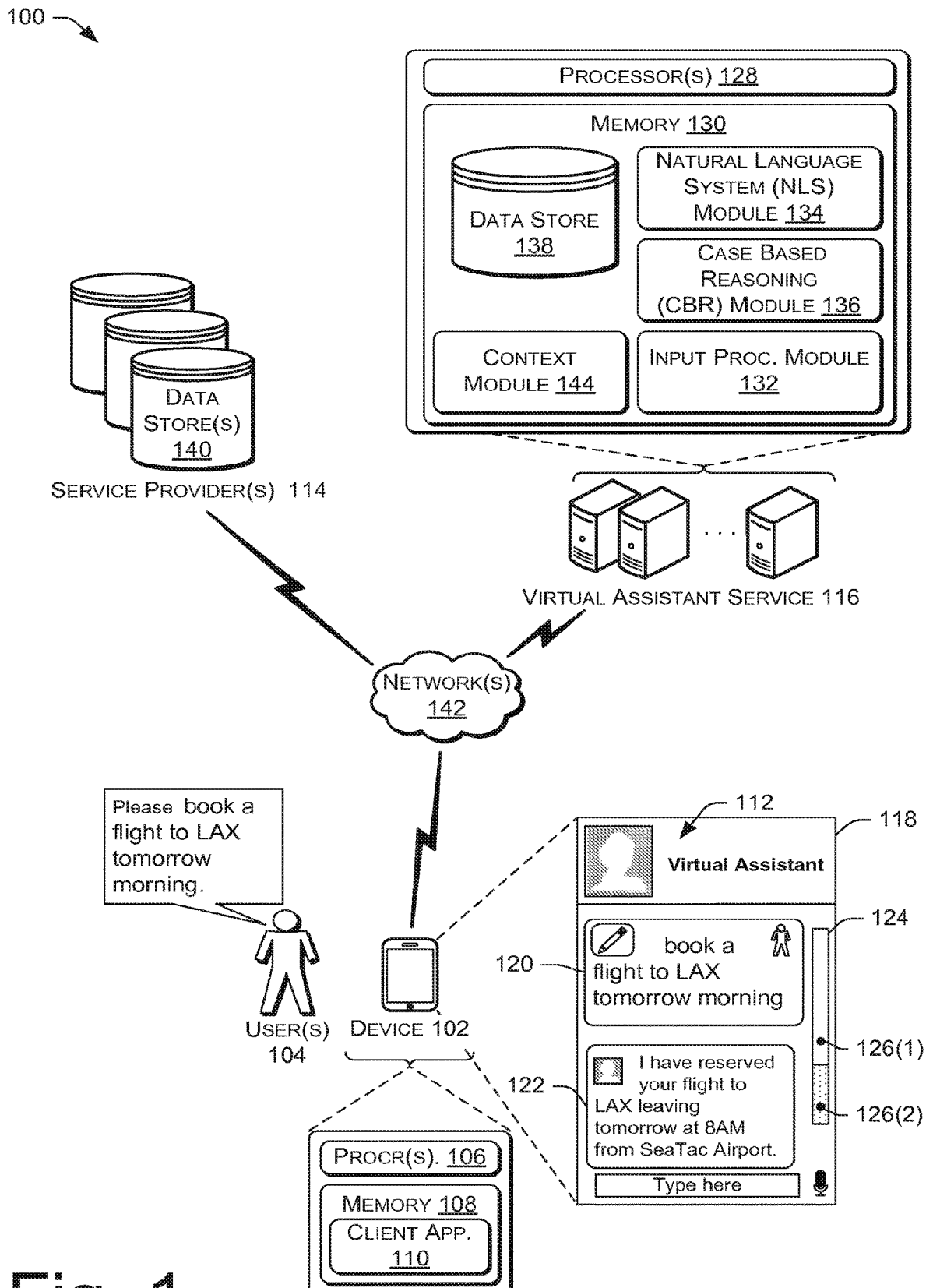
FIG. 1 illustrates an example architecture in which techniques described herein may be implemented.

This disclosure describes, in part, virtual assistant user interfaces that include contextual interface items. In some instances, a conversation user interface may be displayed on a smart device to enable an interaction between a user and a virtual assistant. The conversation user interface may display interface items that are based on learned user preferences.

Often, when computer programs participate in conversations, information about the people they are conversing with may be learned. For example, a conversational system that helps a user select a flight may notice that a person prefers a particular seating arrangement or departure airport. This disclosure discusses a system which may use the information state accumulated during a person-machine conversation and a case-based analysis to derive preferences for the person participating in that conversation. However, it is understood that the approach need not be limited to case-based analysis. For example, various embodiments contemplate using a statistical based analysis.

Various embodiments contemplate that a system may be implemented using a parallel, distributed algorithm on a clustered system. By way of example, various embodiments contemplate implementing a version of the system based on a MapReduce framework. Various embodiments contemplate that this may allow for near real-time generation of a user's preferences regardless of the total case memory size.

Various embodiments contemplate that a preference learning system may be implemented in a Natural Language System (NLS) environment. For example, some NLS enables designers to craft user-directed and machine-directed conversation templates. Users of the system may initiate these templates by starting a conversation with the system. For example, the conversation may take the form of a chat or a task to complete. However, various embodiments contemplate that a user may design or designate rules that the system may learn and/or apply. Various embodiments contemplate that an application may be running in a domain. For example, an application may be running in an airline domain. A person may ask the system "how much does it cost to check an extra bag?" and the system may respond with a simple response, for example, "$10." This may be considered a user-directed conversation.

In contrast, a machine-directed conversation may turn the user's request into a task to be completed, and the system may ask the user a series of subsequent questions to support that task. The system may keep track of what information has been gathered and what is still missing to complete the task in a form, or conversation state object. For example, suppose the person wants to book a flight. They may start by saying "I need to fly to Seattle on Tuesday." The system may then ask a series of questions of the user to fill in the remaining information needed to complete the task.

Various embodiments contemplate that a validation step may be performed for each form component, or slot, to ensure that the user has supplied valid information and may re-prompt the user in the case of invalid data. When the user has filled in all of the slots in the form through conversation, the system often has enough information to complete the task by booking the flight the user requested.

Often, a user-directed conversation may be conducted by a user asking questions of the system. A machine-directed conversation may be conducted by a system asking questions of a user. Systems which may perform both of these tasks are sometimes called mixed-initiative systems. Mixed-initiative dialogue systems often have been shown to both perform well and adapt well to different domains.

Designing a machine directed conversation often includes a number of steps. Often a first step is creating the tasks the system will be capable of performing (defining the set of available forms). For each task in the system, the next step may be determining the data needed to complete the task (defining the slots in the form to be filled). Once the task is well-defined, a final optimization step may be looking at ways to minimize the number of questions the system must ask in order to complete the task. Often this is important if a person is expected to return to the system and complete this task many times, as may be the case when booking travel.

Often, for a given person, answers to certain questions may be consistently the same or similar. For example, if a person is a frequent traveler and books flights through the system, there may be a high likelihood that the flight's departure airport will be the home airport of the person. In another example, suppose the person prefers aisle seats. This may become evident after only a small number of bookings. Various embodiments contemplate that a way to shorten the task completion turns, a person's preferences may be learned based on previous conversations with the user.

Various embodiments contemplate that various systems may reduce the number of turns required to complete a task for a returning user, which may thereby increasing the user's satisfaction with the system. Additionally or alternatively, allow the user to adjust the level of personalization the system displays to them. Additionally or alternatively, store the learned preferences in a way that they may be quickly and easily retrieved and displayed to the end user. Additionally or alternatively, create preferences from user input in near real-time. Additionally or alternatively, confirm new preferences with the user to prevent unexpected user experiences. Additionally or alternatively, allow users to change their preferences at any time. Additionally or alternatively, scale easily as the number of users and input history grows.

Although many examples described herein relate to an airline or communication context, the techniques described herein may be implemented within any context or domain. Further, although many examples are described herein in the context of visually displayed user interfaces, these techniques may, in some instances, be implemented with audible user interfaces (e.g., presented through a speaker of a smart device) or other contexts.

This brief introduction is provided for the reader's convenience and is not intended to limit the scope of the claims, nor the proceeding sections. Furthermore, the techniques described in detail below may be implemented in a number of ways and in a number of contexts. One example implementation and context is provided with reference to the following figures, as described below in more detail. It is to be appreciated, however, that the following implementation and context is but one of many.

Example Architecture

FIG. 1 illustrates an example architecture 100 in which techniques described herein may be implemented. The architecture 100 includes a smart device 102 configured to interact with one or more users 104 (hereinafter the user 104) and perform other processing discussed herein. The smart device 102 may comprise any type of computing device that is configured to perform an operation. For example, the smart device 102 may be implemented as a laptop computer, a desktop computer, a server, a smart phone, an electronic reader device, a mobile handset, a personal digital assistant (PDA), a portable navigation device, a portable gaming device, a tablet computer, a watch, a portable media player, a television, a set-top box, a computer system in a car, an appliance, a camera, a robot, a hologram system, a security system, a home-based computer system (e.g., intercom system, home media system, etc.), a projector, an automated teller machine (ATM), a pair of glass with computing capabilities, and so on.

The smart device 102 may be equipped with one or more processors 106, memory 108, a display(s), a microphone(s), a speaker(s), a camera(s), a sensor(s), and a network interface(s). The sensor(s) may include an accelerometer, compass, gyroscope, magnetometer, Global Positioning System (GPS), olfactory sensor (e.g., for smell), or other sensor. In some instances, the display(s) is implemented as one or more touch screens. The camera(s) may include a front facing camera and/or a rear facing camera. The display(s), microphone(s), speaker(s), camera(s), and/or sensor(s) may be configured to receive user input, such as gesture input (e.g., through the camera), touch input, audio or speech input, and so on, and/or may be configured to output content, such as audio, images, video, and so on.

The memory 108 may include a client application 110 (e.g., module) configured to interface with the user 104. The client application 110 may receive any type of input from the user 104, such as audio or speech, text, touch, or gesture input received through a sensor of the smart device 102. The client application 110 may also provide any type of response, such as audio, text, interface items (e.g., icons, buttons, menu elements, etc.), and so on. In some implementations, the client application 110 is implemented as, or in association with, a mobile application, a browser (e.g., mobile browser), and so on.

The client application 110 may be implemented as, or in conjunction with, a virtual assistant 112 (e.g., an intelligent personal assistant). A "virtual assistant" may generally act as an interface between end users and information of one or more service providers 114 (hereinafter the service provider 114), information of the smart device 102, information of a virtual assistant service 116, or any type of information. For example, in response to input from the user 104, the virtual assistant 112 may access content items stored on the service provider 114 to formulate a response to the user 104. In some instances, the virtual assistant 112 may embody a human-like persona and/or artificial intelligence (AI). For example, the virtual assistant 112 may be represented by an image or avatar that is displayed on the smart device 102. An avatar may comprise an animated character that may take on any number of shapes and appearances, and/or resemble a human talking to a user. In some instances, the avatar may be arranged as a representative of the service provider 114, while in other instances the avatar may be a dedicated personal assistant to a user.

The virtual assistant 112 may interface with the user through a conversation user interface 118. The conversation user interface 118 may provide conversation items representing information from the virtual assistant 112 and/or information from the user 104. For example, in response to a query from the user 104 to "find the nearest restaurant," the conversation user interface 118 may display a dialog representation of the user's query and a response item of the virtual assistant 112 that identifies the nearest restaurant to the user 104. A conversation item may comprise an icon (e.g., selectable or non-selectable), a menu item (e.g., drop down menu, radio control, etc.), text, a link, audio, video, or any other type of information. Additionally or alternatively, a virtual assistant 112 may be configured for multi-modal input/output (e.g., receive and/or respond in audio or speech, text, touch, gesture, etc.), multi-language communication (e.g., receive and/or respond according to any type of human language), multi-channel communication (e.g., carry out conversations through a variety of computing devices, such as continuing a conversation as a user transitions from using one computing device to another), and other types of input/output or communication.

A conversation item may be associated with one or more pieces of contextual information, such as a conversation history, a user preference, and so on. In one example, as illustrated in FIG. 1, the conversation user interface 118 may display a conversation item 120 that indicates what information has been obtained from the user 104 and what information is missing to perform a task (e.g., a check mark indicator indicates that the departure city has been identified, while the stippling indicator indicates that the return date is missing). In another example, as also illustrated in FIG. 1, the conversation user interface 118 may display a conversation item 122 that represents information obtained for reserving a flight. Here, the user 104 and virtual assistant 112 have exchanged various pieces of information to reserve a flight (e.g., flight amount, departure date, return date, flight number, airlines, etc.). Upon reserving the flight, the conversation item 122 may be displayed to represent the exchanged information and/or other information for the reservation (e.g., a total amount paid for a reserved flight, a confirmation number of a reserved flight, etc.). Further example contextual conversation items are discussed below.

In addition to conversation items, the conversation user interface 118 may include other interface items. For example, the conversation user interface 118 may include a microphone icon for speech input, a text box to input text, a keyboard (e.g., touch screen keyboard), other input icons, and so on. In some instances, the conversation user interface 118 includes a timeline bar 124 that displays position of a conversation. The timeline bar 124 may include indicators 126(1)-(2) (e.g., markings) to indicate locations of conversation items that have been tagged. In the example conversation user interface 118 of FIG. 1, the "Flight Reservation" conversation item 122 is tagged, as indicated by the flag. The indicator 126(2) is presented in the timeline bar 124 to indicate this tagging.

In some instances, the conversation user interface 118 may adapt an input mode for a user based on contextual information. For example, if a user primarily uses text input, the conversation user interface 118 may present a touch keyboard when the interface 118 is accessed. In another example, if a user is located in a car, the conversation user interface 118 may enable a microphone (e.g., listen for audio through the microphone). Additionally, or alternatively, the conversation user interface 118 may include functionality to tag a conversation item, as discussed in further detail below.

Although the conversation user interface 118 has been described as being associated with the smart device 102, in other examples the conversation user interface 118 is associated with the service provider 114 and/or the virtual assistant service 116. In one instance, the interface 118 is displayed through an online site of the service provider 114, such as when the user navigates to the online site. Here, the interface 118 may include a virtual assistant that embodies characteristics of the service provider 114, such as a flight attendant for an online airline site.

In many instances, the virtual assistant 112 operates in cooperation with the virtual assistant service 116. That is, one or more functions of the virtual assistant 112 may be performed by the virtual assistant service 116. The virtual assistant service 116 may generally provide one or more services, such as speech recognition, response formulation, context analysis, user characteristic analysis, and so on. For instance, input received at the smart device 102 from a user may be sent to the virtual assistant service 116 to interpret the speech and formulate a response to the input. The response may include outputting content (e.g., outputting audio (an audible answer), video, an image, text, a hyperlink, etc.), performing an action related to content (e.g., logging a user into a site, navigating to a web site, upgrading a user's seat assignment, purchasing an item, etc.), and so on. In some instances, a response may be addressed to or otherwise tailored to a particular user (e.g., "Yes, John, as a Gold Customer you are entitled to a seat upgrade, and I have provided some links below that may be of interest to you . . . ."). After formulating a response, the virtual assistant service 116 may provide the response to the smart device 102 to be output and/or to cause the smart device 102 to perform an action. As such, the virtual assistant service 116 may operate as a "back-end" resource.

The virtual assistant service 116 may include one or more computing devices. The one or more computing devices may be implemented as one or more desktop computers, laptop computers, servers, and the like. The one or more computing devices may be configured in a cluster, data center, cloud computing environment, or a combination thereof. In one example, the virtual assistant service 116 provides cloud computing resources, including computational resources, storage resources, and the like, that operate remotely to the smart device 102.

The one or more computing devices of the virtual assistant service 116 may include one or more processors 128 and memory 130. The memory 130 may include software functionality configured as one or more "modules." The term "module" is intended to represent example divisions of the software for purposes of discussion, and is not intended to represent any type of requirement or required method, manner or necessary organization. Accordingly, while various "modules" are discussed, their functionality and/or similar functionality could be arranged differently (e.g., combined into a fewer number of modules, broken into a larger number of modules, etc.). As illustrated in FIG. 1, the memory 130 includes an input processing module 132, a Natural Language System (NLS) module 134, a Case Based Reasoning (CBR) module 136, and a context module 144.

The input processing module 132 may perform various techniques to process input received from a user. If, for example, the input is speech input, the input processing module 132 may perform speech recognition techniques to convert the input into a format that is understandable by a computing device, such as text. Additionally, or alternatively, the input processing module 132 may utilize Natural Language Processing (NLP) to interpret or derive a meaning and/or concept of the input. The speech recognition and/or NLP techniques may include known or new techniques. Various embodiments contemplate that this may be done in conjunction with the NLS module 134.

The NLS module 134 may be configured to observe user activity and attempt to learn characteristics about a user. The NLS module 134 in conjunction with the CBR module 136 may learn any number of characteristics about the user over time, such as user preferences (e.g., likes and dislikes), track patterns (e.g., user normally reads the news starting with the sports, followed by the business section, followed by the world news), behaviors (e.g., listens to music in the morning and watches movies at night, speaks with an accent that might impact language models, prefers own music collection rather than looking for new music in the cloud, etc.), and so on. To observe user activity and learn a characteristic, the NLS module 134 and CBR module 136 may access a user profile, track a pattern, monitor navigation of the user, and so on. Each of these learned characteristics may be useful to provide context that may be utilized to interpret input received from the user.

As an example of the learning, consider a scenario where a user incorrectly inputs "Cobo" or a speech recognition system incorrectly recognized the user input as "Cobo". Once the user corrects this to say "Cabo", the learning module 134 can record this correction from "Cobo" to "Cabo" in the event that a similar situation arises in the future. Thus, when the user next speaks the phrase "Cabo San Lucas", and even though the speech recognition might recognize the user input as "Cobo", the virtual assistant service 116 will use the learned correction and make a new assumption that the user means "Cabo" and respond accordingly. As another example, if a user routinely asks for the movie "Crazy", the NLS module 134 and CBR module 136 may learn over time that this is the user preference and make this assumption. Hence, in the future, when the user says "Play Crazy", the virtual assistant service 116 will make a different initial assumption to begin play of the movie, rather than the original assumption of the song "Crazy" by Willie Nelson.

The context module 144 may be configured to identify (e.g., determine) one or more pieces of contextual information. The context module 144 may take into account contextual information when determining an intent or meaning of a user's query. In addition, after identifying the user's intent with use of the context, the context module 144 may again take this context into account when determining a response or reply to provide back to the user. In some instances, the context module 144 may take the same pieces of context into account when identifying the intent and the response, while in other instances the techniques may take into account different pieces of context. In some instances, by taking context into account in at least these locations, a response may be provided to a user that more closely emulates human-to-human interaction, in comparison to traditional techniques for identifying virtual assistant responses.

Further, in some instances the context module 144 may take into account contextual information when no query has been received from a user. For example, the context module 144 may monitor a location of a user to determine when the user has arrived at a particular location. Upon arrival at the particular location, information may be presented that is relevant to that location (e.g., provide a boarding pass upon arrival at an airport). In this example, the monitoring may occur in the background (e.g., when the user is not interacting with a virtual assistant).

Generally, contextual information may comprise any type of information that is associated with a user, a device, or other information. In some instances, contextual information is expressed as a value of one or more variables, such as whether or not a user has signed in with a site (e.g., "is_signed_in=true" or "is_signed_in=false"). When contextual information is associated with a user, the contextual information may be obtained with the explicit consent of the user (e.g., asking the user if the information may be collected). Contextual information may be stored in a context data store 138. Example, non-limiting pieces of contextual information may include:

- Conversation information describing a conversation between a user and a virtual assistant, either during the current session or during a previous session(s) (e.g., a conversation history (input and/or output) during a current or previous conversation session). For example, the conversation information may include the input that is received from a user (e.g., "what is the weather like outside") and/or the output from a virtual assistant (e.g., "it's 40 degrees outside").
- Content output history describing content that has been output to a user during a conversation or at any time. For example, the output history may indicate that a sports web page was output to a user during a conversation. In another example, the output history may identify a song that a user listened to on a home stereo receiver or a movie that was played on a television.
- Input mode history indicating one or more input modes that a user has used to interact with a user interface (e.g., text, touch, or speech input via a conversation user interface of a virtual assistant and/or another user interface).
- What type of input mode a user prefers to interact with a virtual assistant (e.g., input mode—whether the user prefers to submit a query textually, using voice input, touch input, gesture input, etc.). A preferred input mode may be inferred from previous interactions, explicit input of the user, profile information, etc.
- Calendar information describing one or more events of a user (e.g., a scheduled flight, a work meeting, etc.).
- Message information describing a message that has been sent via a messaging service (e.g., a text message, an email, an instant messaging message, a telephone call, etc.). The messaging information may identify the content of the message, who the message was sent to, from whom the message was sent, etc.
- A location of a cursor on a site when a user provides input to a virtual assistant.
- A time of day or date (e.g., a time of day at which a user provides input to a virtual assistant).
- An age or gender of a user.
- Location information describing a previous, current, or future location of a user or device associated with the user (e.g., a geo-location of a device through which the user provides a query, location based on network information, mailing address of the user, etc.).
- Sensor information obtained from a sensor of a device with which a user is interacting (e.g., a geo-location, environmental data including background noise or video/audio from a surrounding of the device, etc.);
- Device information indicating a device type with which a user interacts with a virtual assistant (e.g., a mobile device, a desktop computer, game system, etc.).
- An orientation of a device which a user is using to interact with a virtual assistant (e.g., landscape or portrait).
- A communication channel which a device of a user uses to interface with a virtual assistant service (e.g., wireless network, wired network, etc.).
- A language associated with a user (e.g., a language of a query submitted by the user, what languages the user speaks, etc.).
- How an interaction with a virtual assistant is initiated (e.g., via user selection of a link or graphic, via the virtual assistant proactively engaging a user, etc.).
- How a user has been communicating recently (e.g., via text messaging, via email, etc.).
- Information derived from a user's location (e.g., current, forecasted, or past weather at a location, major sports teams at the location, nearby restaurants, etc.).
- Current topics of interest, either to a user or generally (e.g., trending micro-blog or blog topics, current news, recent micro-blog or blog posts made by the user, etc.).
- Whether or not a user has signed-in with a site of a service provider (e.g., with a user name and password).

A status of a user with a service provider (e.g., based on miles flown, a type of membership of the user, a type of subscription purchased by the user, etc.).

A page of a site from which a user provides a query to a virtual assistant.

How long a user has remained on a page of a site from which the user provides a query to the virtual assistant.

Social media information describing interactions of a user via a social networking service (e.g., posts or other content that have been viewed and/or posted to a social networking site or blog).

Search information describing search input received from a user and search output provided to the user (e.g., a user searched for "luxury cars," and 45 search results were returned).

User preference information describing a preference of a user (e.g., a seat preference, a home airport, a preference of whether schedule or price is important to a user, a type of weather a user enjoys, types of items acquired by a user and identifying information for those items, types of stock a user owns or sold, etc.).

User profile information (e.g., information identifying friends/family of a user, information identifying where a user works or lives, information identifying a car a user owns, etc.).

Purchase history identifying items that have been acquired by a user.

Any characteristic of a user (e.g., learned characteristics).

Although the modules 132-136 and 144 are illustrated as being included in the virtual assistant service 116, in some instances one or more of these modules may be included in the smart device 102 or elsewhere. As such, in some examples the virtual assistant service 116 may be eliminated entirely, such as in the case when all processing is performed locally at the smart device 102 (e.g., the smart device 102 operates independently).

The memory 108 and/or 130 (as well as all other memory described herein) may include one or a combination of computer storage media. Computer storage media includes volatile and non-volatile, removable and non-removable media implemented in any method or technology for storage of information, such as computer readable instructions, data structures, program modules, or other data. Computer storage media includes, but is not limited to, phase change memory (PRAM), static random-access memory (SRAM), dynamic random-access memory (DRAM), other types of random access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. As defined herein, computer storage media does not include communication media, such as modulated data signals and carrier waves. As such, computer storage media is non-transitory media.

The service provider 114 may include one or more data stores 140 for storing content items. For example, the service provider 114 may include a mobile web data store, a smart web data store, an information and content data store, a content management service (CMS) data store, and so on. A mobile web data store may store content items that are designed to be viewed on a mobile device, such as a mobile telephone, tablet device, etc. Meanwhile, a web data store includes content items that are generally designed to be viewed on a device that includes a relatively large display, such as a desktop computer. An information and content data store may include content items associated with an application, content items from a data base, and so on. A CMS data store may include content items providing information about a user, such as a user preference, user profile information, information identifying offers that are configured to a user based on profile and purchase preferences, etc. As such, the service provider 114 may include content items from any type of source. Although the one or more data stores 140 are illustrated as included in the service provider 114, the one or more data stores 140 may alternatively, or additionally, be included in the virtual assistant service 116 and/or the smart device 102.

The architecture 100 may also include one or more networks 142 to enable the smart device 102, the virtual assistant service 116, and/or the service provider 114 to communicate with each other. The one or more networks 142 may include any one or combination of multiple different types of networks, such as cellular networks, wireless networks, Local Area Networks (LANs), Wide Area Networks (WANs), the Internet, and so on.

Example Architecture

Figure 2:
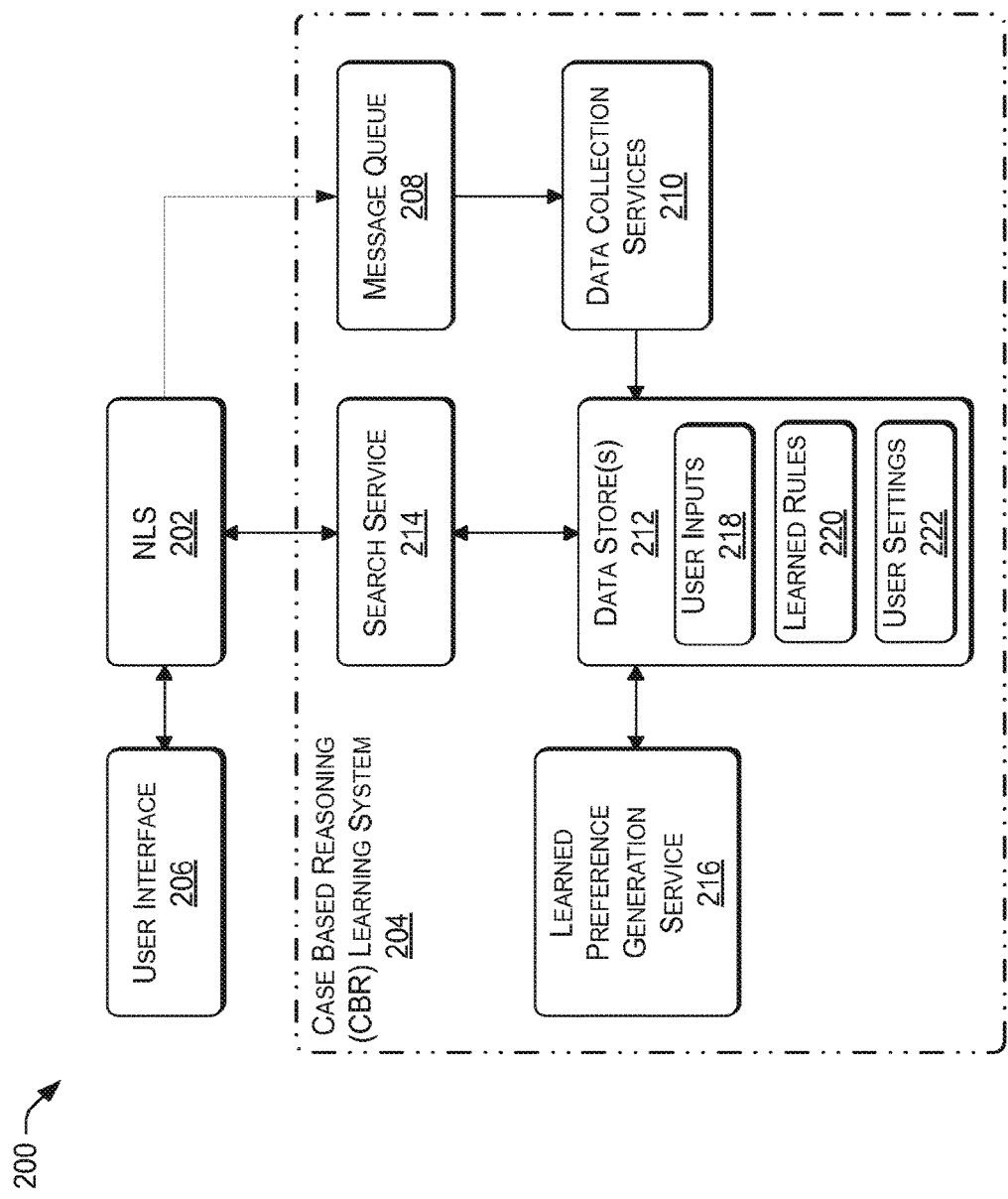
FIG. 2 illustrates an additional example architecture in which techniques described herein may be implemented.

FIG. 2 illustrates an example architecture 200 in which techniques described herein may be implemented. The architecture 200 includes a Natural Language System (NLS) 202 that may be coupled to a Case Based Reasoning (CBR) Learning System 204. Additionally or alternatively, the NLS 202 may be coupled to a user interface 206, which may be able to interact with one or more users.

Various embodiments contemplate that there are two or more integration points for the CBR Learning System 204 with the NLS 202. For example, one may be where the NLS 202 queues user responses in the message queue 208 for the Data Collection Services 210 to process and insert into the Data Store 212. The actual processing steps may be performed in the Learned Preferences Generation Services (LPGS) 216 as discussed below.

Various embodiments contemplate that another area of integration is the Search Service 214. For example, the NLS 202 may use the Search Service 214 to check for learned preferences, which may be referred to as rules, that might be available to help derive information for the in-focus or present task. The NLS 202 may also retrieve rules to verify with the current user through the user interface 206. The user can then indicate whether or not the system should keep the retrieved rule.

Additionally or alternatively, data store 212 may comprise multiple types or records and data. For example, data store 212 may comprise user inputs 218, learned rules 220, and/or user settings 222.

As will be discussed in greater detail below, the results of the LPGS 216 processing may comprise a set of rules that may be placed in the Data Store 212. For example the Data Store 212 may contain:

a. User inputs for analysis (case memory)—Individual task-related user interactions with the NLS. Includes the user input text and meta data such as input means, timestamp, and NLS conversation state variables.

b. Learned preferences (case-base)—Rules created from successful cases that have been analyzed and retained for use in future cases.

c. User defined settings—Settings such as if the use of preferences are enabled for a user, and per user thresholds of repetitive behavior before creating a preference solution. Additionally or alternatively, the user may be able to create custom rule definitions.

For example, a user may create a custom rule definitions. Various embodiments contemplate that this may include a list of tasks in a domain and in each task a list of learnable slots may be identified. Various embodiments contemplate that by selecting a slot the user may be presented with a list of variables to choose which ones the user may feel make up the context. Additionally or alternatively, the interface could be part of the user interface when the user is asked a question. For example, an icon may be displayed that the user may choose to mark that slot as something they would like the system to learn about them. In that dialog box there may be a list of variables where the user may choose which ones the user may think are needed to make the values and context unique.

Various embodiments contemplate that a case memory document structure may comprise one or more of ID—case identifier; UserID—system wide unique user identifier; PreviousPrompt—the slot variable the user was previously prompted for; JustPrompted—the slot variable the NLS just prompted the user for after their answer; Context—a text object, for example, a JSON object, holding pairs of conversation state variable names and values at the time the user was prompted for the slot variable; SearchContext—a case-normalized form of the Context stored as an array of [name,value] pairs sorted by variable names; Answer—the value of the slot variable named by PreviousPrompt that was filled in from the users input; Order—sequence number used to order inputs for this user; or TimeStamp—time from web server when user input occurred.

Various embodiments contemplate that a case-based document structure may comprise one or more of ID—the learned preference identifier; Active—flag used to determine if this specific preference is available for use; Prompt—the slot variable name the user was prompted for; EndContext—a text object, for example, a JSON object, holding pairs of conversation state variable names and values representing the state of the system after the user had successfully filled in the slot variable contained in Prompt; Type—the function type that discovered this learned preference; UserID—system wide unique user identifier; Verified—flag used to determine if the user has verified that this preference is acceptable; StartContext—a text object, for example, a JSON object, holding pairs of conversation state variable names and an array of values observed at the time the user was prompted for the slot variable contained in Prompt; SearchKeys—array comprising an index, for example, an array of SHA-1 hex strings computed for each combination of name:value pairs in StartContext; TaskID—the task that this preference relates to; SlotFeatures—the set of variable relationships defined for this Prompt in this TaskID that was created by the domain knowledge expert when the task was defined, where it may be saved with the learned preference built from it for reporting and system auditing purposes; or Entries—a list of case IDs that contributed to this preference.

Example Interaction

Figure 3:
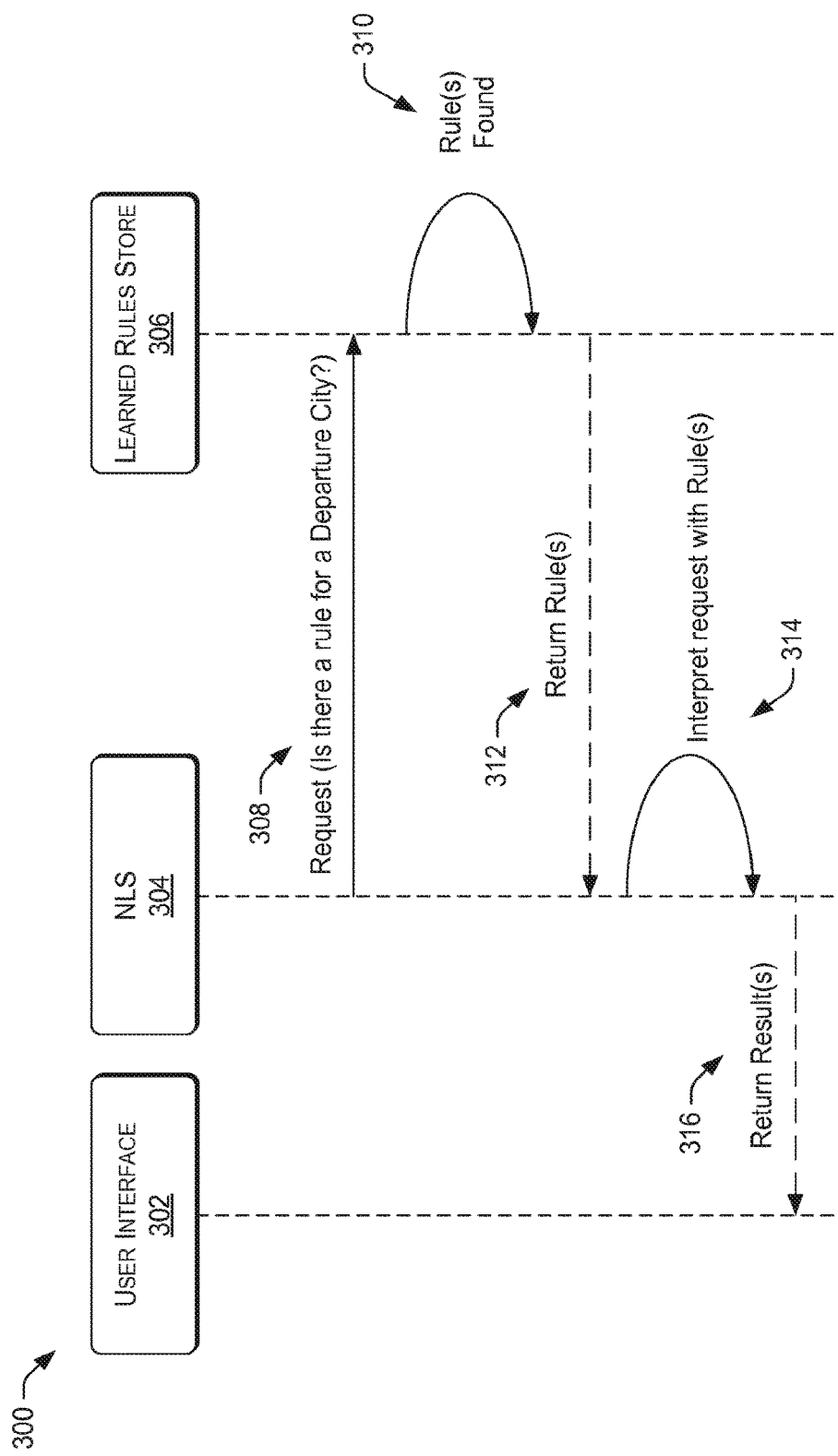
FIG. 3 illustrates an example of an interaction between exemplary architecture.

FIG. 3 illustrates an example of an interaction between exemplary portions of an architecture 300. For example, a user interface 302 may be coupled to an NLS 304, which may in turn be coupled to a learned rules store 306. Various embodiments contemplate that the architecture 300 may receive a request 308. For example, a user may cause the system to look at flights. As part of the interaction with the user, the architecture 300 may cause the NLS 304 to check if an applicable learned rule is available. For example, the NLS 304 may query a learned rules store 306 with information associated with the request 308. In various situations, a rule may be found, for example, rule found 310. Various embodiments contemplate that the rule found 310 may be returned to the NLS 504. Various embodiments contemplate that the NLS 304 may interpret 314 the request 308 with the rule found 310. Various embodiments contemplate that the NLS 304 may apply the rule found 310 and return the results 316 to the user interface 302.

Additionally or alternatively, various embodiments contemplate that the Search Service may be implemented as a lightweight HTTP service that translates requests for prior learned behaviors from the NLS into efficient queries against a database, for example, MongoDB, and returns any matching cases.

Example Interfaces

Figure 4:
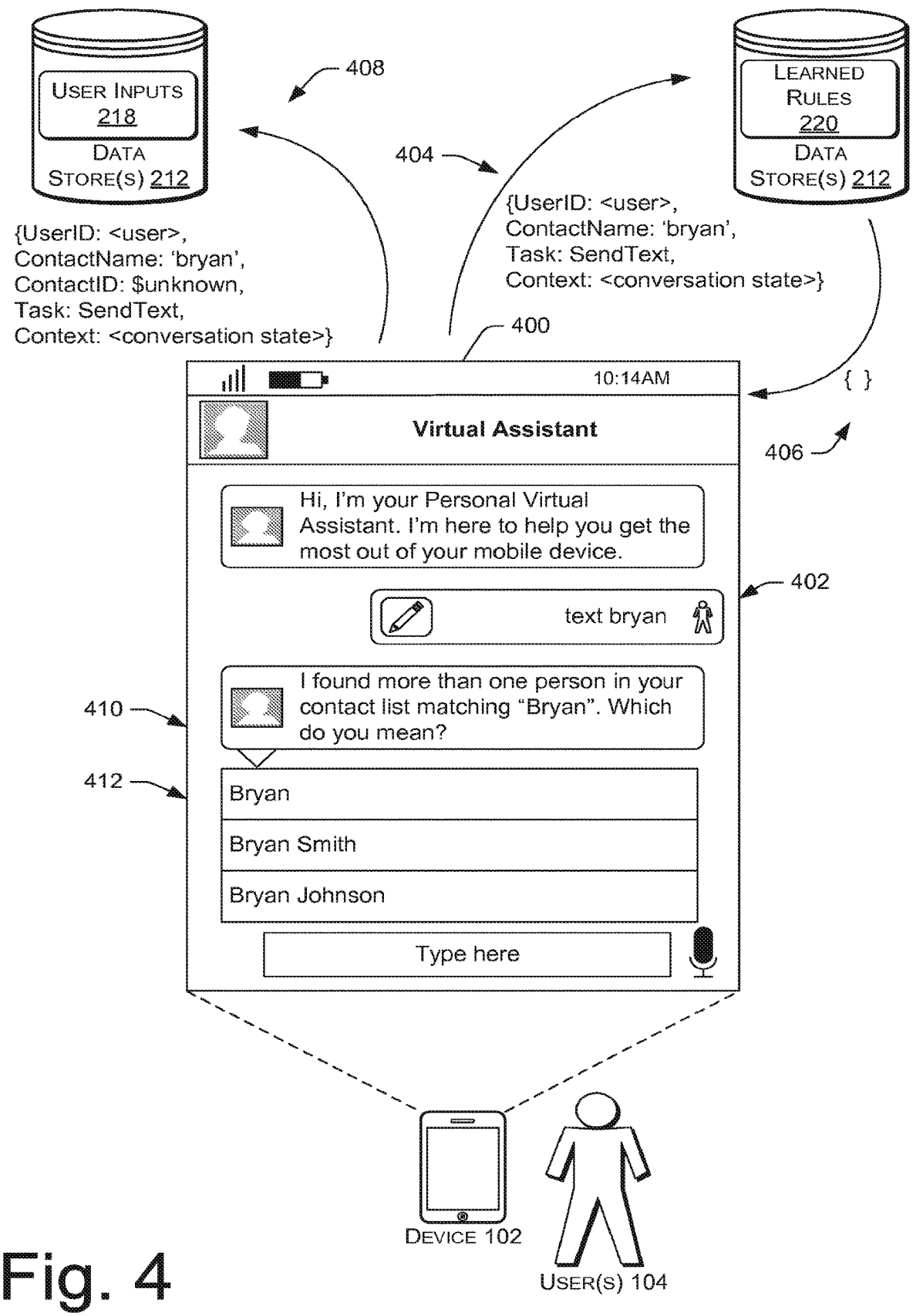
FIG. 4 illustrates an example conversation user interface that displays a conversation associated with a user along with exemplary architecture and exemplary structures.

FIG. 4 illustrates an example conversation user interface 400 that displays a conversation associated with a user along with exemplary architecture and exemplary structures.

For example, FIG. 4 shows a user interface 400 that may indicate an input from a user. For example, the user interface may display an input 402, for example "text bryan." Various embodiments contemplate that the input from the user may be accomplished through various and multiple modalities. Various embodiments contemplate that the device 102 may send data 404 to a database to search for an applicable rule. Various embodiments contemplate that an applicable rule will not be returned, for example, at 406. Various embodiments contemplate that the system may send data 408 to a user inputs 218 data store for later examination. Various embodiments contemplate that the system may continue to process the user request and display a clarifying question, or a request for additional input 410 and suggested responses or options 412.

Figure 5:
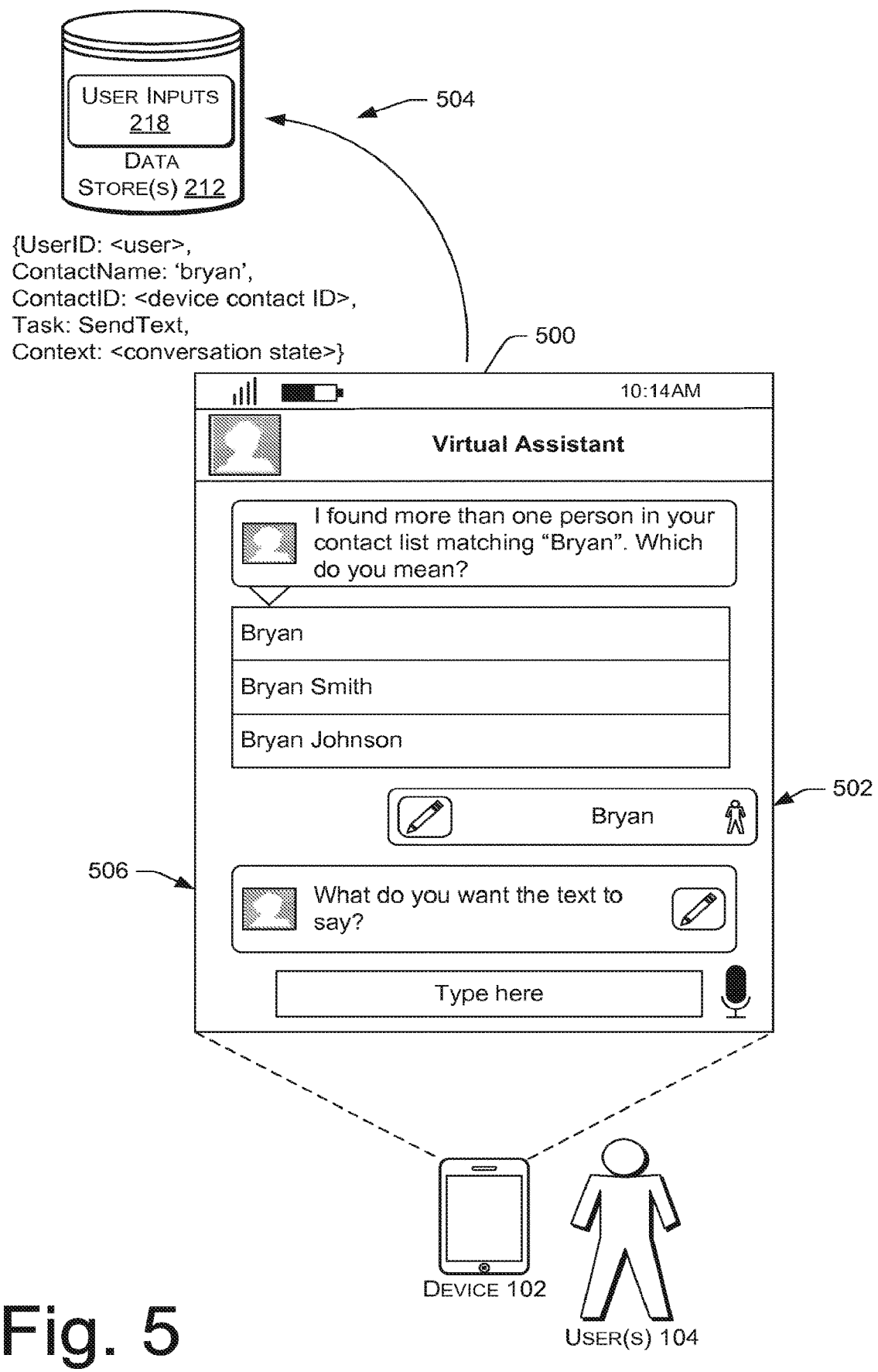
FIG. 5 illustrates additional portions of the example conversation user interface of FIG. 4.

FIG. 5 illustrates additional portions of the example conversation user interface of FIG. 4. For example, FIG. 5 shows user interface 500, where the user may have input a response 502. Various embodiments contemplate that the system may store conversation data and the response in the user inputs 218 database. Various embodiments contemplate that the system may continue to process and respond to the user request at 506.

Figure 6:
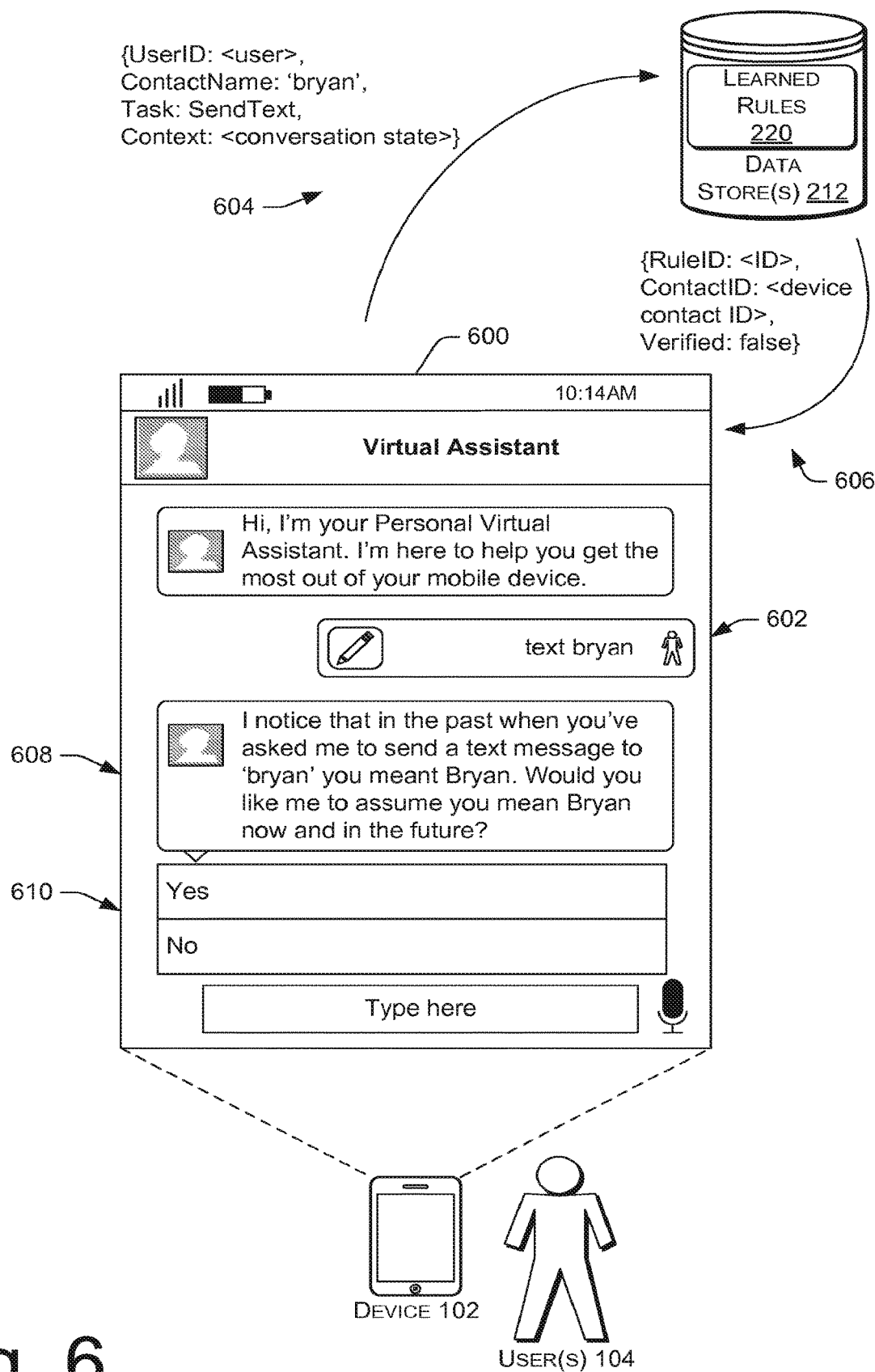
FIG. 6 illustrates an example conversation user interface that displays a conversation associated with a user along with exemplary architecture and exemplary structures.

FIG. 6 illustrates an example conversation user interface that displays a conversation associated with a user along with exemplary architecture and exemplary structures. For example, FIG. 6 shows a user interface 600 that may indicate an input from a user. For example, the user interface may display an input 602, for example "text bryan." Various embodiments contemplate that the input from the user may be accomplished through various and multiple modalities. Various embodiments contemplate that the device 102 may send data 604 to a database to search for an applicable rule. Various embodiments contemplate that an applicable rule will be returned, for example, at 606. Various embodiments contemplate that the system may determine whether the rule has been validated. If the rule has not been validated, then the system may ask the user to validate the rule or decline for example at 608. The user may indicate that the rule is validated or not through various modes, including selecting an option at 610.

Figure 7:
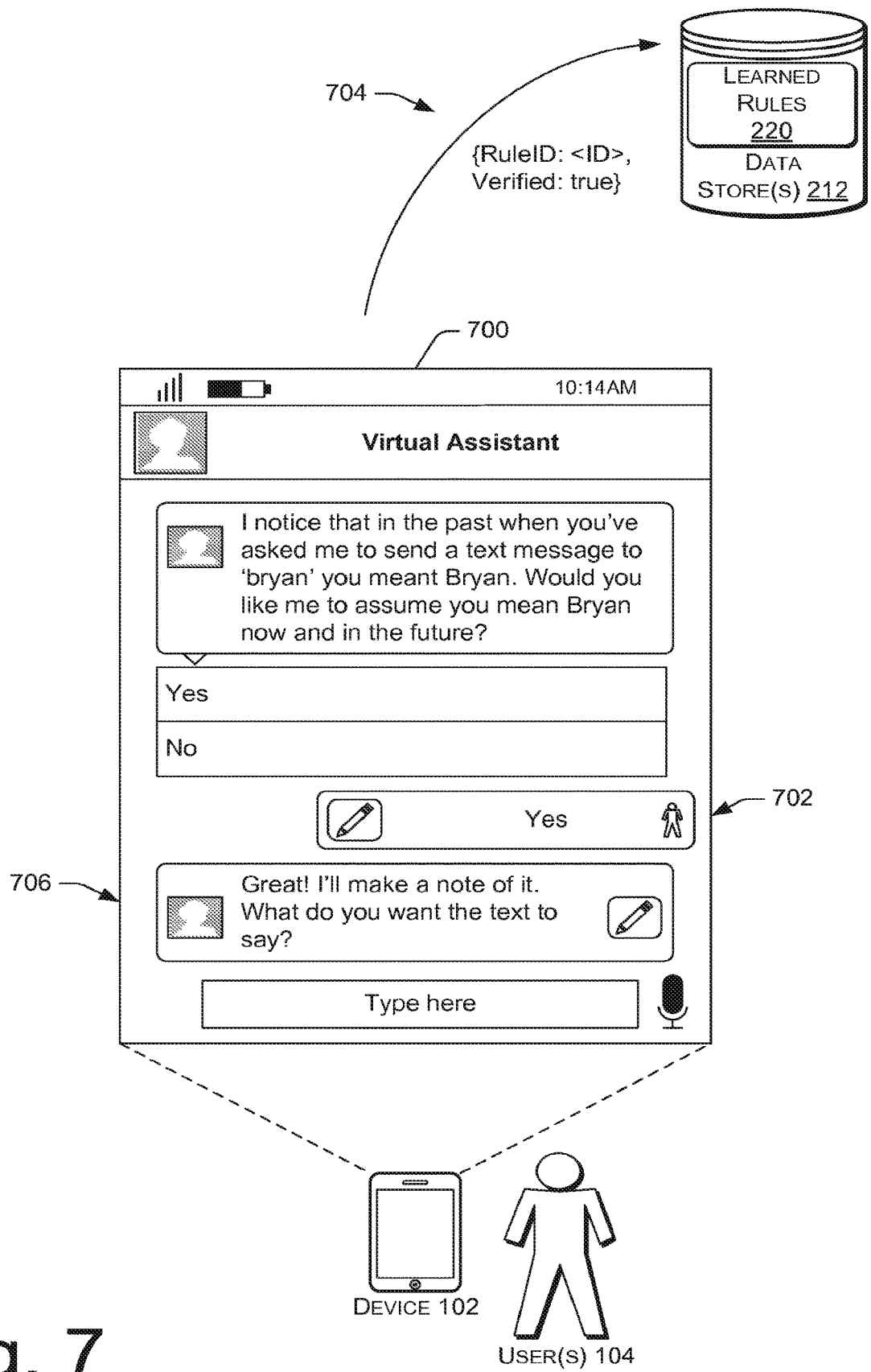
FIG. 7 illustrates additional portions of the example conversation user interface of FIG. 6.

FIG. 7 illustrates additional portions of the example conversation user interface of FIG. 6. For example, FIG. 7 shows a user interface 700 where the user may have entered a response 702. Various embodiments contemplate that the system may send data 704 to the learned rules 220 database indicating that the rule is now validated. Various embodiments contemplate that the system may continue to respond to the user's original request at 706.

Figure 8:
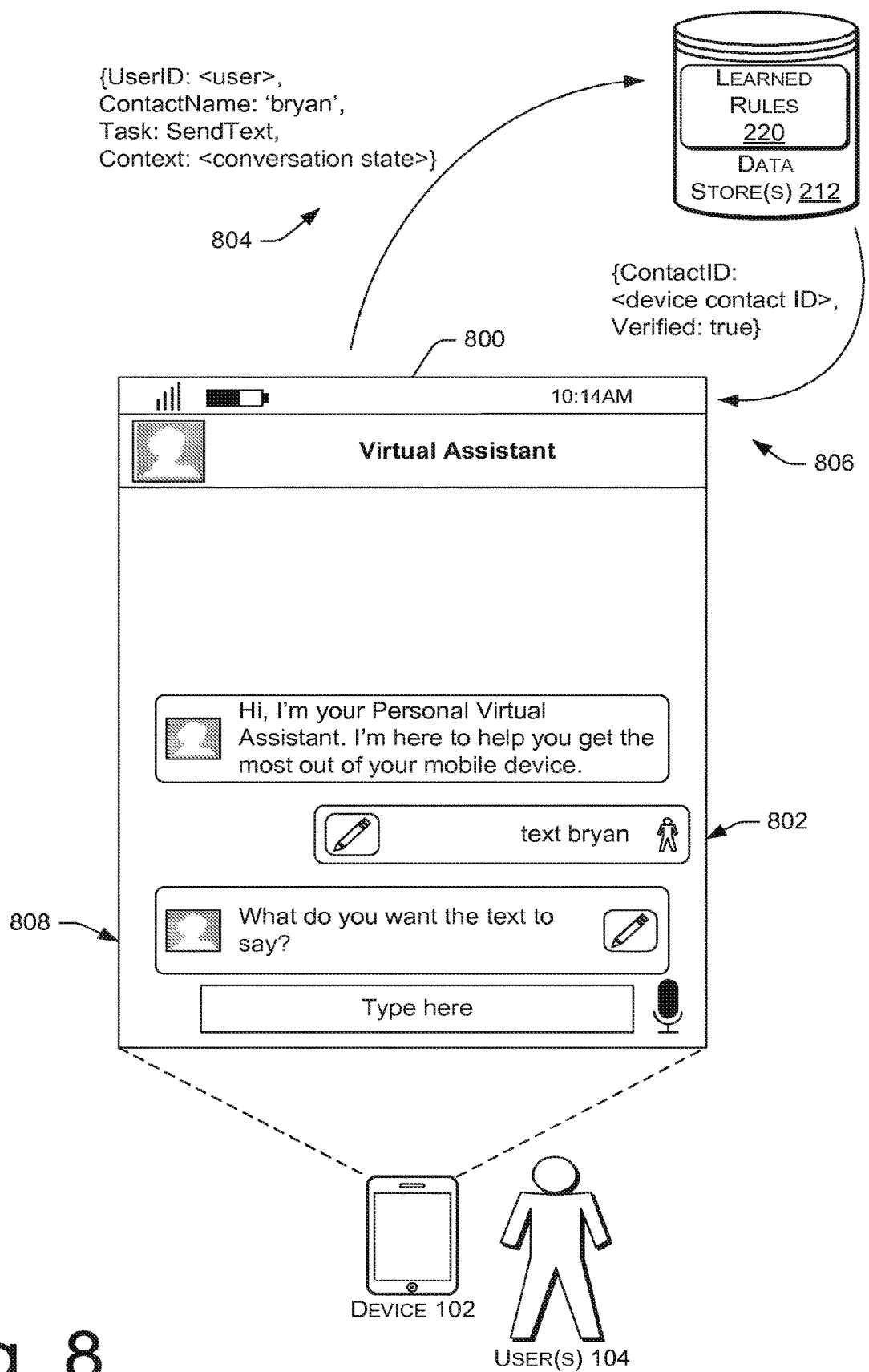
FIG. 8 illustrates an example conversation user interface that displays a conversation associated with a user along with exemplary architecture and exemplary structures.

FIG. 8 illustrates an example conversation user interface that displays a conversation associated with a user along with exemplary architecture and exemplary structures. For example, FIG. 8 shows a user interface 800 that may indicate an input from a user. For example, the user interface may display an input 802, for example "text bryan." Various embodiments contemplate that the input from the user may be accomplished through various and multiple modalities. Various embodiments contemplate that the device 102 may send data 804 to a database to search for an applicable rule. Various embodiments contemplate that an applicable rule will be returned, for example, at 806. Various embodiments contemplate that the system may determine whether the rule has been validated. If the rule has been validated, then the system may apply the returned rule 806 and may continue to respond to the user's original request at 808. Here, for example, the system applied the rule that "text bryan" meant that the user intended that the system send a text to Bryan as opposed to other Bryan's in a contact list.

Example Processes

Figure 9:
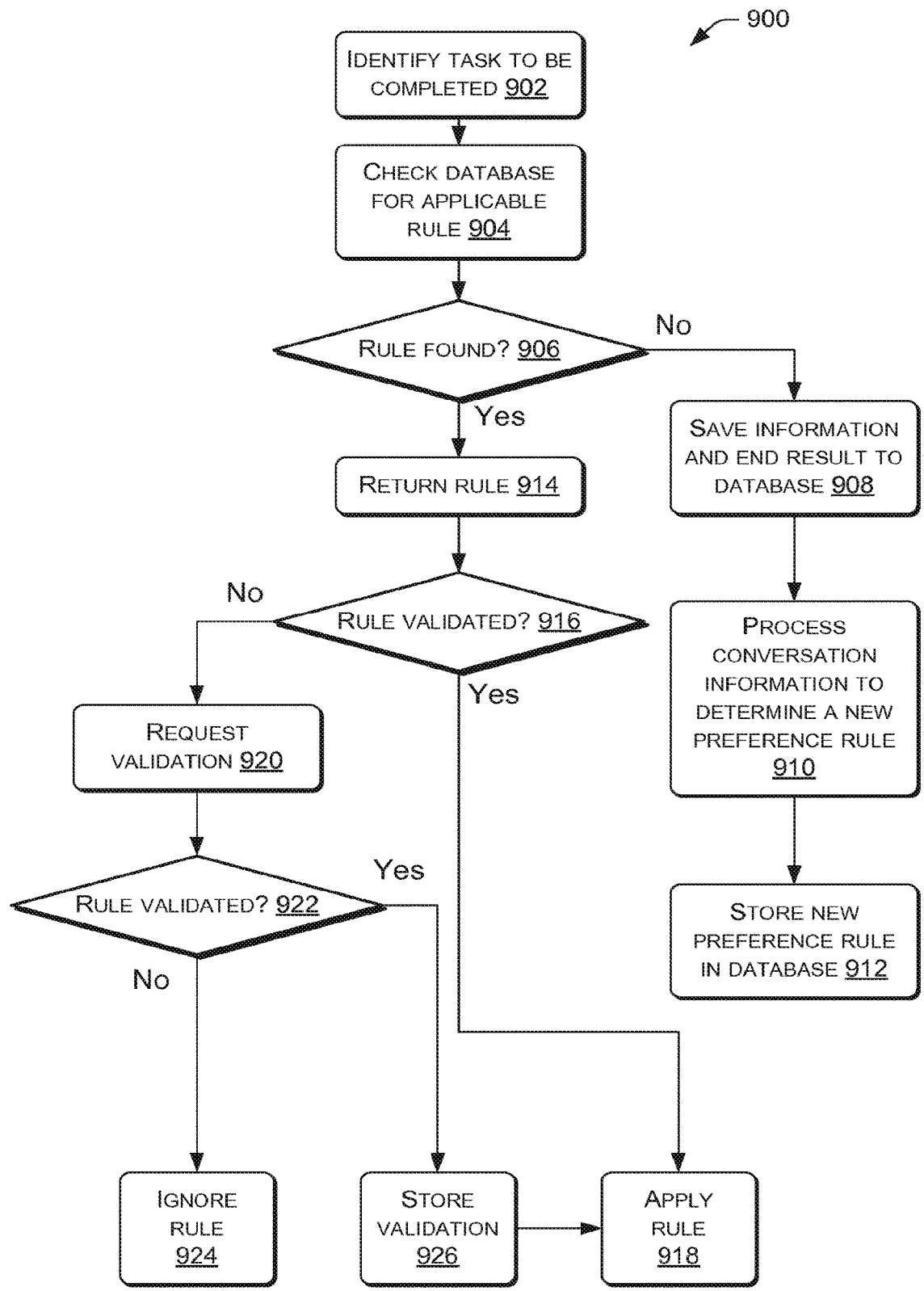
FIG. 9 illustrates an example process for identifying an applicable user preference.
Figure 10:
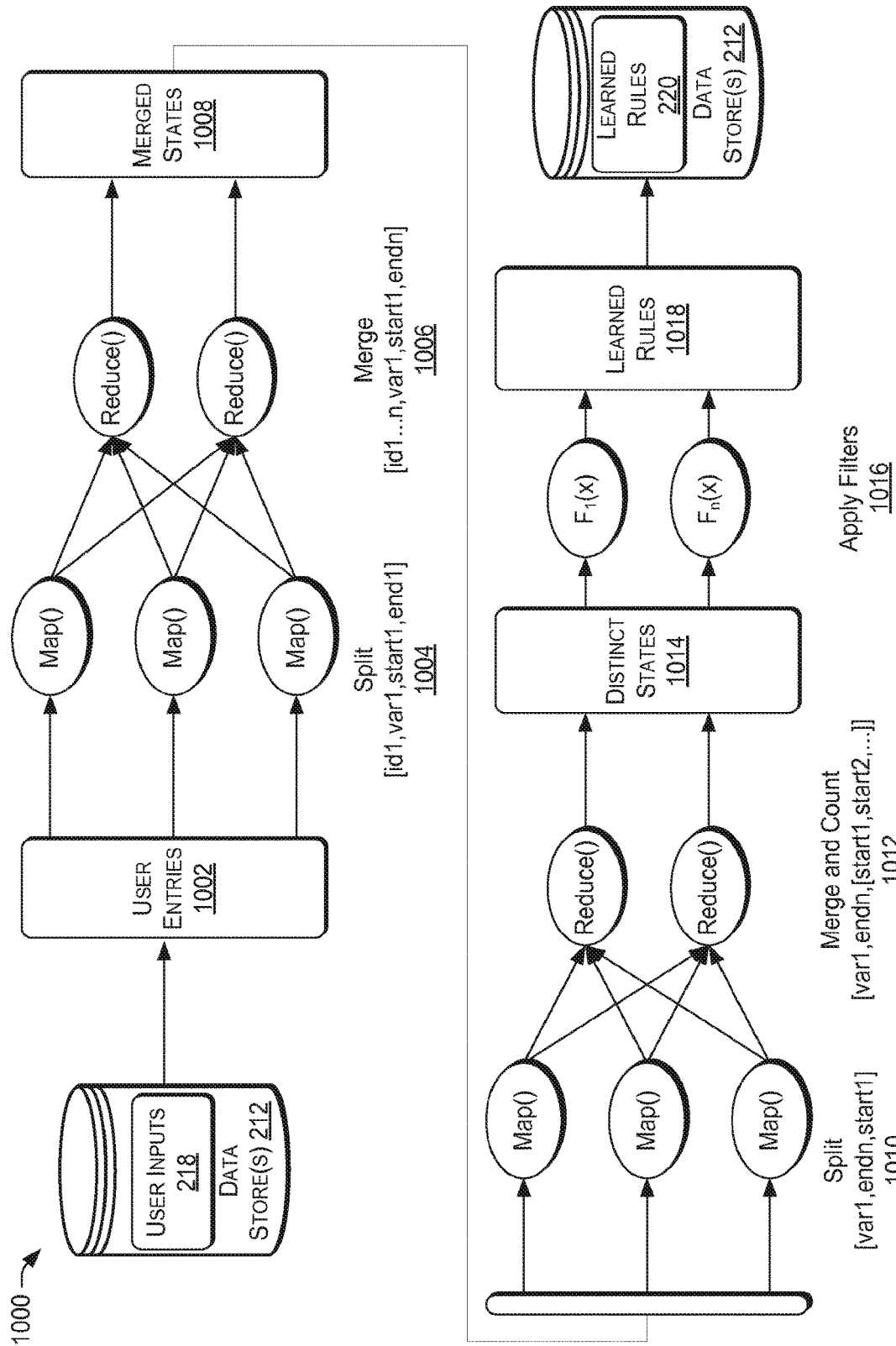
FIG. 10 illustrates an example process for evaluating stored user entries that may determine learn rules indicative of learned user preferences.

FIGS. 9 and 10 illustrate example processes 900-1000 for employing the techniques described herein. For ease of illustration processes 900-1000 are described as being performed in the architectures 100 and 200 of FIGS. 1 and 2. For example, one or more of the individual operations of the processes 900-1000 may be performed by the smart device 102 and/or the virtual assistant service 116. In many instances, the processes 900-1000 are performed by the virtual assistant 112 implemented at least in part on the smart device 102. However, the processes 900-1000 may be performed in other architectures. Moreover, the architectures 100 and 200 may be used to perform other processes.

The processes 900-1000 (as well as each process described herein) are illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process. Further, any number of the described operations may be omitted.

FIG. 9 illustrates an example process 900 for identifying an applicable user preference. For example, at 902, the system may identify a task to be completed. Various embodiments contemplate that the task may be identified as part of a mixed initiative conversation where, for example, a user may ask a question of the system where the system may determine additional information is needed to respond to the user's request. Various embodiments contemplate that the additional information may fill slots that may be used to complete the task.

At 904, various embodiments contemplate that the system may check a database for an applicable rule that may be useful in accomplishing the task. For example, various embodiments contemplate that the applicable rule may assist in filling a slot as part of accomplishing the task.

At 906, if a rule is not found, then the system may store information related to the task identification and any conversational context as well as any end result reached from the task completion process.

At 910, the stored information, for example, conversational information, may be processed to define a new preference rule.

At 912, various embodiments contemplate that any new preference rule may be stored in the database as a possible applicable rule. Various embodiments contemplate that a newly stored preference rule may be found as an applicable rule if the same or a similar task in the same or similar context arose again.

However, if at 906, an applicable rule is found, then the applicable rule may be returned at 914.

Various embodiments contemplate that the applicable rule may be validated prior to the system applying the rule. For example, if the rule is determined to be validated at 916, then the rule may be applied at 918.

However, if at 916, the rule is determined to not be validated, then at 920 the system may request validation of the rule from a user.

At 922, the system may receive input indicating that the rule was not validated by a user. Then, at 924, the system may ignore the rule.

However, if at 922, the system receives input indicating that the rule has been validated, then at 926, the validation may be stored.

Example Processes

FIG. 10 illustrates an example process for evaluating stored user entries that may determine learn rules indicative of learned user preferences.

The LGPS may be implemented as a pipeline of distributed parallel computing, for example, MapReduce jobs and filter functions whose input may comprise a users conversational history over a specific prompt in a specific task from case memory, and output may be any learned preferences, which may be referred to as rules, that may be assumed for that prompt. A prompt by the NLS may be an attempt to fill in a slot in a form of information needed for the NLS to complete a specific task. By pre-populating slots with a user's past answers, a task may be completed faster and with less back and forth prompting and responding with the user.

Various embodiments contemplate a MapReduce pipeline comprising two jobs. The first MapReduce job, as seen in FIG. 10 at 1002-1008, compresses continuous user inputs that are trying to complete the same slot within the same task. It may take the user several interactions with the NLS to resolve a specific slot since the user may give incorrect or incomplete data, or respond to the system prompt with a clarifying question of their own.

The compression may be done by keeping track of when the user was first prompted for the slot, and when the slot was either filled in or abandoned. If the slot is eventually filled in, the prompting case's slot value and starting context may be combined with the final case's slot value and ending context. If the slot is never satisfied the conversation may be thrown out as there is no final answer to be learned from it.

When the first job completes, the compressed cases may be stored along with the cases where the slot was resolved in a single interaction.

As shown in FIG. 10 at 1008-1014, the second MapReduce job may be started on the first job's results. This second job may attempt to count all of the slot outcomes for this user that may be equivalent. First by grouping all of the cases by end context and then merging them into a single case, containing a list of all starting states that created the end context.

At 1016, these final cases may be passed through a set of functions, for example, filters, that may determine if the answer was given often enough to create a rule based on the users current settings. At 1018, cases that meet these conditions may be stored in the case-base as a learned preference.

This pipeline may be applied to a user's history any time the user has a new interaction with the NLS containing tasks that have 'learnable' slots or whenever a user changes their thresholds or other settings in the application settings.

Additionally or alternatively, various embodiments contemplate that domain experts often define the set of tasks in the NLS and also define slots within those tasks that may be learned. Certain slots, in some instances, should never be saved as cases for learning. For example, such as arrival or departure dates or the body of a text message.

Domain experts may define what is learnable and the context expected for the rules. However various embodiments contemplate that a user could add context to a rule from the available context to modify existing rules or to make their own rules. Various embodiments contemplate that a user may be limited to using variables that the system, for example, as designed by a designer, makes available for use.

Figure 11:
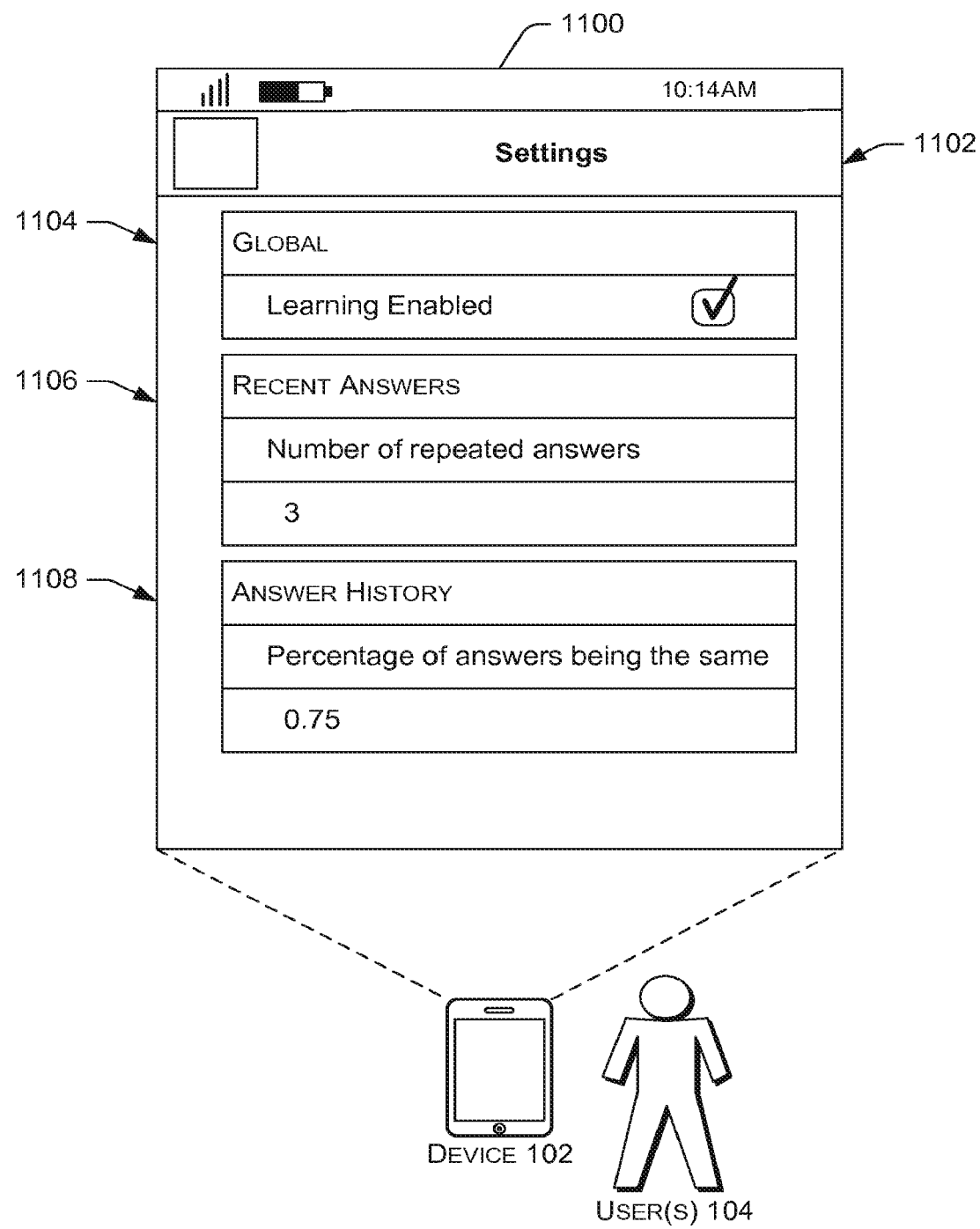
FIG. 11 illustrates an example user interface that displays a settings menu that may be adjusted by a user.

FIG. 11 illustrates an example user interface that displays a settings menu that may be adjusted by a user. For example, user interface 1100 may display a setting menu 1102. The settings menu may comprise various settings. For example, the learning enablement may be turned on or off by a user. Additionally or alternatively, the user may set a threshold of number of repetitions 1106, or an answer history threshold 1108. For example, a user may set a percentage of total answers. Additionally or alternatively, the user may set a consecutive threshold. Additionally or alternatively, various embodiments contemplate using a slider bar, an icon counting display, virtual knobs, among other display options.

Additionally or alternatively, various embodiments contemplate additional settings screens. For example, a user may see what rules the system has identified or learned. Additionally or alternatively the user may manage the rules, including activating, inactivating, or adjusting one or more rules.

CONCLUSION

Although embodiments have been described in language specific to structural features and/or methodological acts, it is to be understood that the disclosure is not necessarily limited to the specific features or acts described. Rather, the specific features and acts are disclosed herein as illustrative forms of implementing the embodiments.

The invention claimed is:

1. One or more non-transitory computer-readable storage media storing computer-readable instructions that, when executed, instruct one or more processors to perform operations comprising:

connecting a virtual assistant service and a remote user device at a conversation user interface on a network;

establishing a machine-directed conversation between the remote user device and a virtual assistant connected to the virtual assistant service;

identifying an active task to be completed in the machine-directed conversation;

identifying contextual information and a respective domain from the machine-directed conversation;

searching a database for an applicable learned rule associated with the contextual information, the searching comprising comparing present case features of the active task to one or more learned rules in the database;

identifying the applicable rule based at least in part on the comparing;

interpreting the active task with the applicable rule, the interpreting comprising requesting, from a user participant of the machine-directed conversation, validation of an un-validated applicable rule; and tagging learnable portions of the applicable rule for use in the respective domain.

2. The one or more non-transitory computer-readable storage media of claim 1, wherein the one or more learned rules are based at least in part on a user-defined threshold for learning rules.

3. The one or more non-transitory computer-readable storage media of claim 1, wherein the present case features comprise one or more of a case identifier, a user identifier, a current conversation state, or the active task.

4. The one or more non-transitory computer-readable storage media of claim 3, wherein the current conversation state comprises an array of variable-value pairs.

5. The one or more non-transitory computer-readable storage media of claim 3, wherein the comparing comprises querying the database based at least in part on a search key, the user identifier, and the case identifier.

6. The one or more non-transitory computer-readable storage media of claim 5, wherein the search key is based at least in part on an index of the current conversation state.

7. One or more non-transitory computer-readable storage media storing computer readable instructions that, when executed, instruct one or more processors to perform operations comprising:

connecting a virtual assistant service and a remote user device at a conversation user interface on a network;

establishing a machine-directed conversation between the remote user device and a virtual assistant from the virtual assistant service;

identifying an active task to be completed in the machine-directed conversation;

identifying a domain in which the machine-directed conversation occurs and associating the active task with a conversation template comprising fillable slots for saving information from the remote user device regarding the active task;

checking a database for an applicable learned rule, the checking comprising comparing present case features of the active task to one or more learned rules in the database, the one or more learned rules being based at least in part on a case-based reasoning model and previously encountered case features;

when no applicable rule is returned based at least in part on the comparing, storing the present case features of the active task to a user input database;

storing a resolution of the active task and case features at resolution to the user input database;

tagging the resolution as context information for use in the domain.

8. The one or more non-transitory computer-readable storage media of claim 7, wherein the one or more learned rules are based at least in part on a user-defined threshold for learning rules.

9. The one or more non-transitory computer-readable storage media of claim 7,
wherein the user input database is mined for cases where a set of beginning case features, and associated end case features are present above a threshold number of occurrences.

10. The one or more non-transitory computer-readable storage media of claim 9, wherein the threshold is a user-defined threshold.

11. The one or more non-transitory computer-readable storage media of claim 10, wherein the threshold is a percentage event-based threshold, consecutive event based threshold or a combination thereof.

12. One or more non-transitory computer-readable storage media storing computer-readable instructions that, when executed, instruct one or more processors to perform operations comprising:
receiving and storing user entries during machine-directed conversations across a conversation user interface between a remote user device and a virtual assistant;
distributing stored user entries to one or more computational nodes on a network comprising connections to a plurality of service provider domains;
condensing, to condensed user entries, stored user entries that attempt to complete one or more slots in conversation templates associated one or more tasks of a respective machine-driven conversation, the condensed user entries comprising a starting context and an ending context;
distributing the condensed user entries to the one or more computational nodes;
reducing, to reduced groups, the condensed user entries to identify equivalent slot outcomes;
filtering the reduced groups to remove groups from the reduced groups that fail to meet one or more criteria; and
identifying learned rules for respective service provider domains based at least in part on the filtered groups.

13. The one or more non-transitory computer-readable storage media of claim 12, wherein one or more criteria comprise a slot satisfaction criteria, wherein a slot of the reduced group is not filled as part of the stored user entries.

14. The one or more non-transitory computer-readable storage media of claim 13, wherein the one or more criteria comprise an occurrence threshold.

15. The one or more non-transitory computer-readable storage media of claim 14, wherein the occurrence threshold is a user-defined threshold.

16. The one or more non-transitory computer-readable storage media of claim 14, wherein the occurrence threshold comprises a percentage event-based threshold, consecutive event based threshold, or a combination thereof.

17. The one or more non-transitory computer-readable storage media of claim 12, wherein the distributing stored user entries and the condensing to condensed user entries comprise a MapReduce action on the stored user entries.

18. The one or more non-transitory computer-readable storage media of claim 12, wherein the distributing the condensed user entries and the reducing to reduced groups comprise a MapReduce action on the condensed user entries.

19. The one or more non-transitory computer-readable storage media of claim 12, wherein the one or more criteria comprise a category of tasks.

* * * * *